US010560466B2

(12) United States Patent
Marck

(10) Patent No.: US 10,560,466 B2
(45) Date of Patent: Feb. 11, 2020

(54) VERTICAL THREAT ANALYTICS FOR DDOS ATTACKS

(71) Applicant: LEVEL 3 COMMUNICATIONS, LLC, Broomfield, CO (US)

(72) Inventor: Shawn Marck, San Francisco, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 546 days.

(21) Appl. No.: 14/991,004

(22) Filed: Jan. 8, 2016

(65) Prior Publication Data

US 2016/0205120 A1 Jul. 14, 2016

Related U.S. Application Data

(60) Provisional application No. 62/102,931, filed on Jan. 13, 2015.

(51) Int. Cl.
*H04L 29/06* (2006.01)

(52) U.S. Cl.
CPC ...... *H04L 63/1416* (2013.01); *H04L 63/1458* (2013.01)

(58) Field of Classification Search
CPC .................. H04L 63/1416; H04L 63/1458
USPC ........................................................ 726/23
See application file for complete search history.

(56) References Cited

U.S. PATENT DOCUMENTS

| 8,131,763 | B2* | 3/2012 | Tuscano | G06F 17/3089 707/783 |
| 9,172,721 | B2* | 10/2015 | Jain | H04L 63/1458 |
| 9,438,556 | B1* | 9/2016 | Ganguly | H04L 61/2007 |
| 2006/0010389 | A1* | 1/2006 | Rooney | H04L 63/1425 715/736 |
| 2007/0130619 | A1* | 6/2007 | Reams, III | H04L 63/1425 726/13 |
| 2011/0138463 | A1* | 6/2011 | Kim | H04L 63/1425 726/22 |
| 2012/0079592 | A1* | 3/2012 | Pandrangi | H04L 47/10 726/22 |
| 2012/0124666 | A1* | 5/2012 | Kim | H04L 63/1458 726/23 |
| 2012/0260337 | A1* | 10/2012 | Van der Merwe | H04L 63/1458 726/22 |
| 2013/0074183 | A1* | 3/2013 | Yoon | G06F 21/00 726/22 |
| 2013/0263256 | A1* | 10/2013 | Dickinson | H04L 63/1458 726/22 |
| 2013/0273994 | A1* | 10/2013 | Cobb | G07F 17/3223 463/18 |

(Continued)

*Primary Examiner* — Lynn D Feild
*Assistant Examiner* — Abdullah Almamun

(57) ABSTRACT

Embodiments are provided to allow institutions and individuals the ability to subscribe to notifications regarding DDoS attacks on certain types of institutions, e.g., institutions that fall into certain market verticals or categories. Subscriber data can be integrated with an attack monitoring platform (AMP), which can push out certain information to a system, which tabulates and analyzes the information regarding attacks. If an attack is detected based on predefined thresholds and conditions, a database lookup is performed and a notification that contains certain attack attributes can be sent out to the appropriate subscribers. Subscribers can also be provided with a mechanism to modify their level of DDoS attack notification threshold.

11 Claims, 4 Drawing Sheets

(56) References Cited

U.S. PATENT DOCUMENTS

| | | | | |
|---|---|---|---|---|
| 2014/0173725 A1* | 6/2014 | Beryozkin | .......... | H04L 63/1458 |
| | | | | 726/22 |
| 2014/0337429 A1* | 11/2014 | Asenjo | .................. | H04L 65/403 |
| | | | | 709/204 |
| 2015/0095969 A1* | 4/2015 | Jain | ..................... | H04L 63/1458 |
| | | | | 726/1 |
| 2016/0127408 A1* | 5/2016 | Miu | .................... | H04L 63/1433 |
| | | | | 726/25 |
| 2016/0173527 A1* | 6/2016 | Kasman | .............. | H04L 63/1458 |
| | | | | 726/23 |
| 2017/0034220 A1* | 2/2017 | Singaraju | .............. | H04L 63/205 |

* cited by examiner

VERTICAL THREAT ANALYTICS FOR DDOS ATTACKS

CROSS-REFERENCES TO RELATED APPLICATIONS

This application claims the benefit of priority to U.S. Provisional Patent Application No. 62/102,931, filed Jan. 13, 2015, titled "VERTICAL THREAT ANALYTICS FOR DDOS ATTACKS," the entire contents of which are fully incorporated by reference herein for all purposes.

BACKGROUND

In a network like the Internet, resources (e.g., pages of a website) may be requested by legitimate and malicious systems and persons alike. A distributed denial of service (DDoS) attack is an attempt to make resources of a network unavailable to legitimate users. A DDoS attack often involves multiple computers acting together to prevent a targeted website or service from functioning properly by having a group of multiple computers repeatedly request network resources of the website or service. This group of multiple computers is often referred to as a bot or botnet. A result of these repeated requests can be that a website or service has difficulty responding to legitimate requests due to an exhaustion of resources of a website's ability to serve content, and thus the website or service is effectively unavailable to legitimate users.

Generating and distributing reports of DDoS attacks for subscribers to gain certain insights can be an involved process. Existing reporting structures do not work in real-time and therefore do not provide subscribers the ability to make decisions on-the-fly that may help them mitigate imminent attacks.

Embodiments of the invention address these and other problems, individually and collectively.

BRIEF SUMMARY

Embodiments can provide institutions and individuals the ability to subscribe to notifications regarding DDoS attacks on certain types of institutions, e.g., institutions that fall into certain market verticals or categories. In one embodiment, subscription can be made via a web application. A subscriber list that includes clients and subscriptions can be created and stored in a database. Subscriber data can be integrated with an attack monitoring platform (AMP). The AMP can push out certain information to a system, which tabulates and analyzes the information regarding attacks. If an attack is detected based on predefined thresholds and conditions, a database lookup is performed and a notification that contains certain attack attributes can be sent out to the appropriate subscribers. Subscribers can also be provided with a mechanism to modify their level of DDoS attack notification threshold.

Other embodiments are directed to systems, devices, and computer readable media associated with methods described herein.

A better understanding of the nature and advantages of embodiments of the present invention may be gained with reference to the following detailed description and the accompanying drawings.

DETAILED DESCRIPTION

When monitoring DDoS attacks, periodic (e.g. quarterly) compilation reports of DDoS attacks may be issued for subscribers to gain certain insights, but these periodic reports do not work in real-time. Therefore, such periodic reports do not provide report subscribers the ability to make decisions on-the-fly that may help them mitigate imminent attacks. Accordingly, embodiments can send real-time notifications of DDoS attack information that may be relevant to recipients. As one example, based on the reports, recipients may take action to buy or increase mitigation services in order to defend against possible impending attacks. As another example, institutions and individuals can also sign up to subscribe for notifications regarding DDoS attacks on certain types of institutions, e.g. ones that fall into certain market verticals. By knowing that DDoS attacks are ongoing against other members of a market vertical, subscribers can be better prepared to respond, e.g., increase mitigation services in anticipation of a possible attach on themselves.

I. INTRODUCTION

In some embodiments, institutions and individuals can subscribe with the system to receive notifications regarding DDoS attacks on themselves or on certain types of institutions, e.g. ones that fall into certain market verticals or categories. As an example, subscription for the notifications can be done on a web application.

In one embodiment, the system can pull attack data from one or more mitigation devices, which can be used to notify subscribers that an attack is underway, e.g., against itself or one or more market vertical members. For instance, the system may start pulling information about the attack and then track the rate of the attack. If the rate of the attack exceeds a predefined threshold, or otherwise meets one or more criteria for a certain set of data, the system could collect the relevant data and put it together in a presentable format to be delivered to subscribers (e.g., a PDF document or link attached to an email).

As another example, the data could be pushed to a subscriber's dashboard, and in addition a clickable link may be sent, for example via email or instant message, where clicking on the link will redirect the subscriber to their dashboard. The system can provide a way to have snapshots in time of attack data. Methods are also provided for modifying levels of DDoS protection.

II. METHOD OF PROVIDING NOTIFICATIONS WITH ANALYTICS

Figure 1:
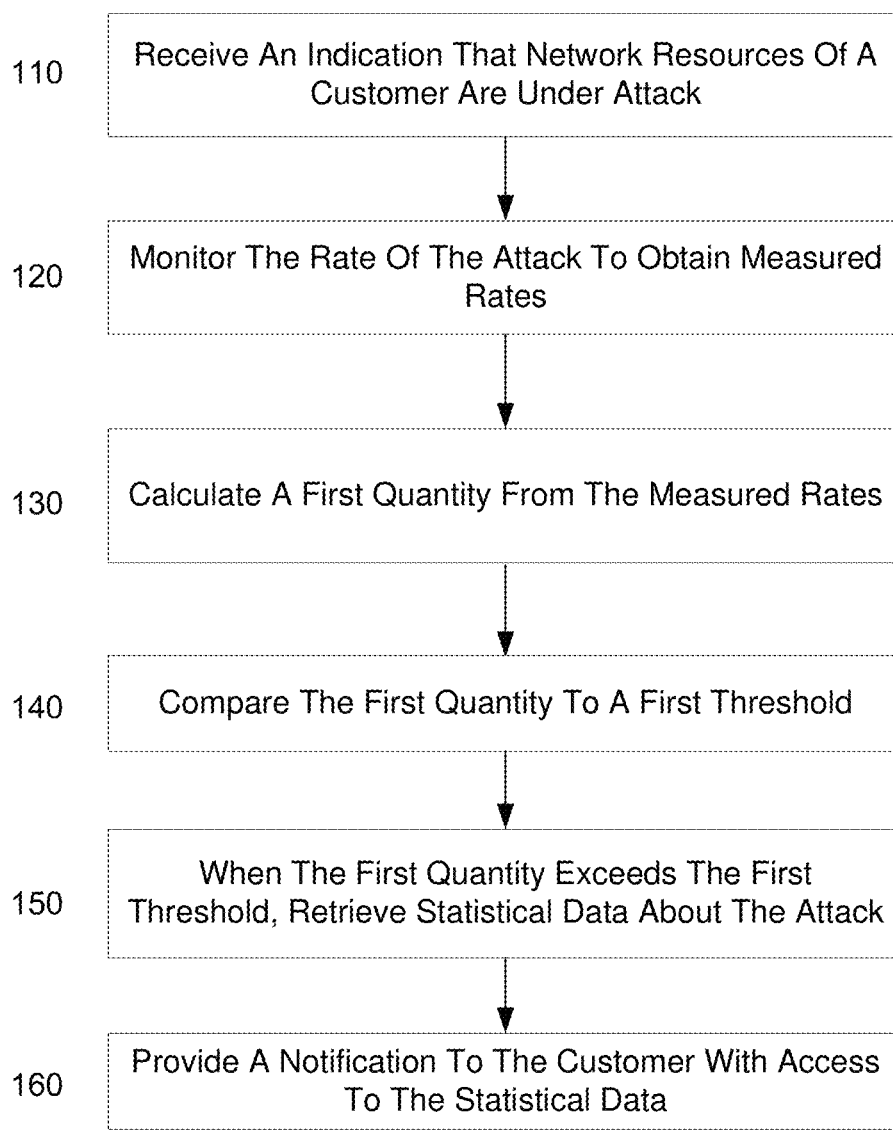
FIG. 1 is a flowchart of a method for providing notifications of a DDOS attack to a customer according to embodiments of the present invention.

FIG. 1 is a flowchart of a method 100 for providing notifications of a DDoS attack to a customer according to embodiments of the present invention. Method 100 can be performed by a mitigation system, which may include one or more of any of edge routers, mitigation devices (e.g. attack monitoring platforms or scrubbing centers), and a central server.

At block 110, a computer system receives an indication that one or more network resources of a customer are under attack. The indication can come from one or more mitigation devices that can provide their data to the system, e.g., in various formats. These mitigation devices can be external systems including anomaly detection systems (ADSs) and network traffic analyzers (NTAs), whose data includes raw data and analytics. The mitigation devices can provide APIs that specify the format for data retrieval. The data can consist of attack data over various time intervals.

Examples of mitigation devices include ADS and NTA modules from NSFOCUS. In these systems an NTA module can collect net flow traffic data and conduct analysis. If DDoS attack traffic is detected, an NTA can trigger alerts, and an ADS can be used for traffic filtering and cleaning. If there is an attack, the NTA can determine that there is excessive traffic from the attacker based on the flow analysis sampling of data from the attacker's IP addresses and can determine that there is an attack in progress The NTA can send this information to the ADS which sends BGP signals to the rest of the environment to tell the system what IP information to start scrubbing and analyzing.

At block 120, the rate of the attack is monitored to obtain one or more measured rates concerning the attack. For example, the data from the one or more mitigation devices can be parsed and analyzed to find out rates of attack. In various embodiments, the data can be monitored by the one or more mitigation devices or by a computer that receives data from the one or more mitigations devices. The data could be transmitted from mitigation devices in a variety of formats. For example, the data could be sent in a variety of formats including XML-based, or in other easily parsed formats.

At block 130, a quantity is calculated from the one or more measured rates. In one embodiment, the quantity is the rate determined in block 120. In another embodiment, the quantity is results from a statistical analysis or other computation involving the one or more measured rates. For example, the overall data could be averaged over time to calculate bits per second attack information. Additionally, the system could calculate the packets per second attack information by average over time. This packet data could also be specific to the type of packet being analyzed. The system could calculate the average attack size over a five minutes period, for example. The system could also calculate the peak attack size, the peak volume information.

At block 140, the quantity is compared to a threshold. This threshold is a value representing a predetermined level of attack, which if exceeded causes the system to obtain more data concerning the attack. As examples, the threshold criteria could be to have at any one point of time a rate of one gigabit per second or some threshold being a sustained average of 1.5 gigabits for over 30 seconds or five minutes, or some other timeframe. The thresholds can also vary by category of data, source, or other criteria.

At block 150, if the quantity has exceeded the threshold, then additional statistical data is retrieved concerning the attack. For example, the system can query the mitigation devices to provide additional relevant data concerning the attack to provide a more complete picture of the attack to the subscriber. For example, the statistical data can include a time plot of the rate of attack. The kind of data could include when attacks started, average duration, different protocols used for attack, attack IP addresses, and peak data rates.

At block 160, a notification is provided to the customer, where the notification includes access to the statistical data. The notification can provide this access to the statistical data in various fashions, for example via a dashboard, a link to a document, or attaching the document to the notification.

III. SUBSCRIPTIONS

In some embodiments, users can subscribe to the system to receive notifications of relevant attacks underway. A subscriber list that includes clients and subscriptions can be created and stored in a database. In one embodiment, one or more market vertical or category attributes may be assigned to potential targets of DDoS attacks. As an example, a large financial institution could be designated in a database as being in the banking vertical. This can be done by the institution when signing up for the service, where the institution can select from a list of categories (verticals) and potentially select from a list of subcategories (more specific verticals). A different bank can sign up for notifications of DDoS attacks on targets that have certain market vertical attributes, e.g. the banking industry, as well as certain other market verticals that the bank services. Thus, the different banks can get a notification when an attack occurs against the large financial institution. In various embodiments, a vertical can be defined by a single category or subcategory, or a vertical can be defined as corresponding to a particular set of categories and/or subcategories.

Subscribers can determine what kind of threshold for reporting they desire, that is what level of attack or observed data rate is acceptable before wanting to be alerted. For example, subscribers can determine by discussing with their IT department what type of reporting is desired. For instance, one might want to know about every attack. Another could also have a different level or threshold of allowed attack that is of significance to them. The system could send computer-generated reports periodically, or provide access to subscribers, allowing them to log in and look at the data. Some users might not care about the data, but just want to have the attack to be mitigated, regardless of whether the attack is of the a large (e.g., 10 gigabit) or smaller (e.g., half gigabit) variety. Still others might want to know if an average rate for a vertical was exceeded. There can be flexibility based on what each subscriber desires. The attack data could be for attacks against that subscriber and also for attacks against one or more members of a vertical. Different thresholds can be specified for both of these attack types.

Verticals can be managed and updated by the system. As more data is obtained on verticals and members, membership data can be updated. In one embodiment, customers can specify keywords associated with their business, and so other subscribers that also specified other similar key words would then be identified as being part of the same vertical even though it was not a predetermined option when they first started. Verticals can also be consolidated as well where appropriate. The system can account for users that are part of multiple verticals or categories. If there would be multiple conflicting messages that would be sent, the system could eliminate the conflicting messages.

IV. TRIGGERS

The thresholds can act as triggers for sending a notification. The system can receive data from various sources (e.g., various mitigation devices). The system and the subscribers can also set varied thresholds for reporting to subscribers. The system can have the threshold set because it may be desirable to only notify if a vertical has an attack that is larger than a certain size. Otherwise, subscribers would be notified for all potential attacks, including smaller attacks that are not of concern to certain subscribers, which could cause certain subscribers to become desensitized due to a high number of relatively small-size attacks. The system can include a piece that extracts attack data and makes business decisions, which might be based on subscriber information as to what their thresholds are. For example, one subscriber might want to see data related to any attack larger than one gigabit per second, while for another subscriber within the same vertical, that threshold is far too low.

The system can periodically use an API to access the current information from a mitigation device and store it in a database. After the system has gathered and analyzed the data and generated statistics, the system can determine that there is an attack in progress (e.g. the data rates have reached a point that exceeds a threshold). At that juncture, there could be a trigger to send up a notification, and the data in the notification could include various data collected and statistical data or data generated from the raw data.

There is a very wide range of possible thresholds In various embodiments, a threshold could be based on a peak at any given data rate (e.g., requests per second) or it could have some threshold of a sustained average of a specific data rate for a specified amount of time (e.g., 30 seconds, five minutes, or other timeframe). It could be based on an average base level or ramping up an increase on the base. The data and threshold could be analyzed against certain graphs or traffic shapes, and the system may draw conclusions from the analysis.

V. OBTAINING DATA AND SENDING NOTIFICATION

Figure 2:
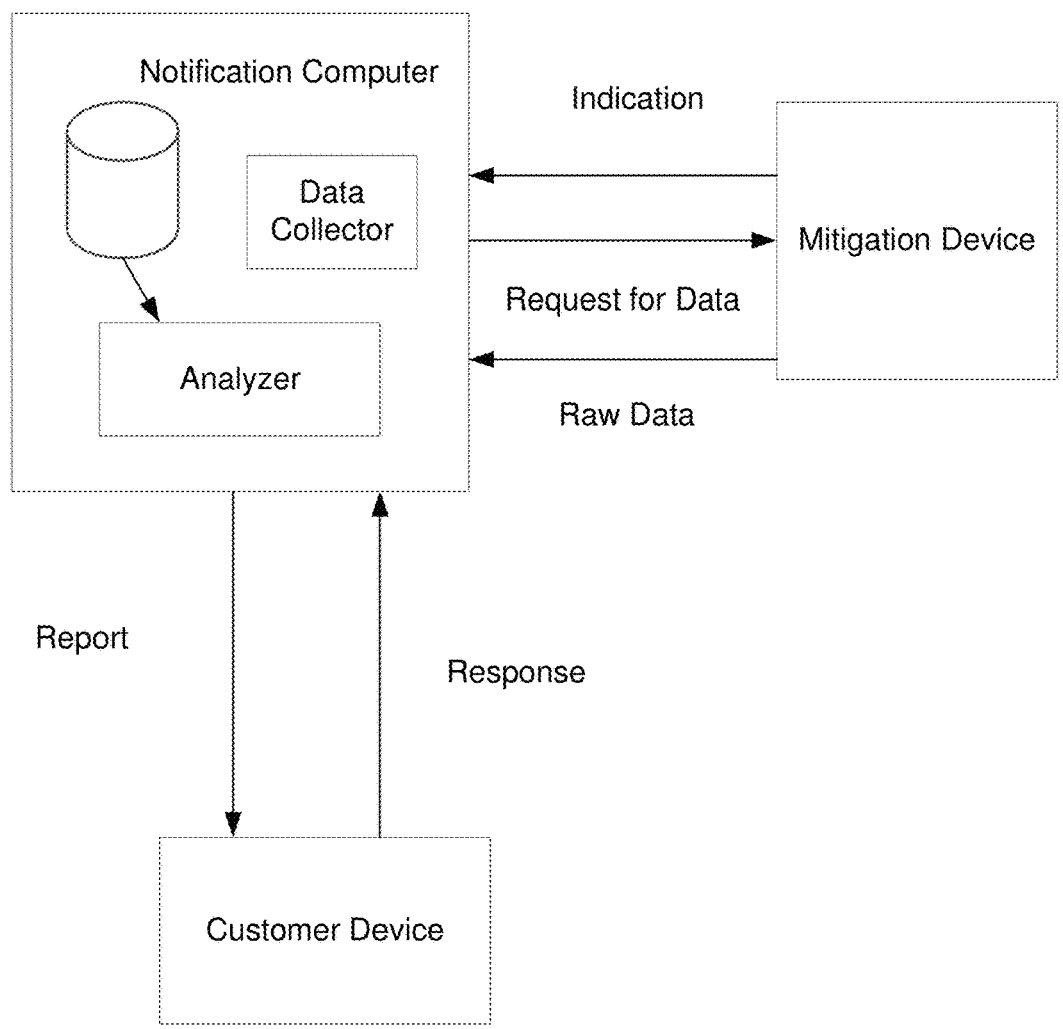
FIG. 2 is a system diagram showing devices and data flow involved in a process for providing notifications according to embodiments of the present invention.

FIG. 2 is a system diagram showing devices and data flow involved in a process for providing notifications according to embodiments of the present invention. APIs can be used between devices and routines within a device to obtain data, analyze the data, provide a notification, and receive a response from a customer.

In FIG. 2, Mitigation Device sends data containing indications of network activity to a Notification Computer. The indication can occur periodically and can be a data rate. In another embodiment, the indication can be that an attack has been identified.

The Notification Computer uses the Data Collector to collect indication data, and store it in a database. The Analyzer can analyze the indication data, and possibly use existing data in the database to determine whether an attack is underway.

The Notification Computer can then monitor the attack to identify if and when the attack exceeds a threshold. The Notification Computer can send a Request for Data to the Mitigation Device to send over additional relevant data when a potential attack is underway. For example, the Notification Computer can poll the Mitigation Device for attack rates or data that can be used to determine the attack rate. The Raw Data from the Mitigation Device is analyzed and potentially stored in the database on the Notification Computer. The data could exceed a threshold, and the Analyzer could then determine that the attack is sufficiently high to send a notification. The Notification Computer can ask for updated data from the Mitigation Device to provide more data to the Customer Device periodically or as needed.

When the Notification Computer determines that the attack is above a threshold, the Notification Computer can send a Report to a Customer Device that is either the target of an attack or is in a relevant market vertical to the observed attack. The Report may contain the attack data, and any additional data requested. The report can be sent in a variety of ways, e.g., in the body of a message (e.g., an e-mail), as an attachment to a message, in a link, etc.

The Customer Device can send a response back to the Notification Computer. The customer's response can be made by a person and, as examples, can be via a message or by accessing the Notification Computer or another computer in the system. For example, a customer can click on a link that sends the customer to a dashboard that displays the attack data. The customer can then click on a button to request additional services.

A. Obtaining Data

The system can request various network traffic data from mitigation devices via APIs, and calculate other data points based on the incoming data. Some of the data desired can include: the bits per second attack information, packets per second attack information depending on what the packet type, average attack size for a specified time period, peak attack rate, and peak volume information. Data is transmitted to subscribers in a variety of formats. Updated data can be sent periodically or on an as needed basis. If an attack starts, a running tally of all activity that has been going on during the attack could be kept and sent to subscribers, including if it ever subsides. The information sent to a subscriber under attack might be different in information than that sent to a subscriber who might have a potential attack coming.

Data that is used by the attack monitoring platform is retained, but can also be condensed. The system may keep only a fixed amount of storage and database capacity for monitoring and recording attack information. Over time, the data can be condensed. While it might be collected every five seconds or 1 minute, after time so that the data does not grow exponentially and fill up all the disks they start condensing the data. Condensed, stored data can be based on every hour worth of data or some other period of time; so the data can be condensed.

The data from mitigation devices can be requested via APIs specified by each mitigation device. The system can periodically access each mitigation device by API and the system might be able to specify the exact kind of data desired from the mitigation devices. Each mitigation device based on their APIs may specify what information the system will have access to. The system may for example utilize 30 APIs to get 30 different values from various mitigation devices.

Reports can be sent to subscribers and potentially put up on their dashboards for visualization. The data contained in these reports may include when an attack stated and ended, the time and amount of data involved, and source IP addresses. The data contained in the reports may be visualized in various graphs. Sometimes attacks are not limited to one kind. Subscribers may be under attack in multiple ways at the same time with different protocols and visualizations could show different colors for the different types of attacks and those colors.

B. Sending Notifications

FIG. 2 shows the sending of notifications of attacks or potential attacks. In FIG. 2, the Notification Computer can send Reports of an attack or potential attack to one or more Customer Devices. These Reports can be sent when either the Customer Device is under a sufficiently high attack, or someone in a related vertical or category to the Customer Device is under a sufficiently high attack. The Customer Device can send a response back to the Notification Computer, containing various responses to the attack data.

Example responses include information that the attack was not relevant to them, that it was relevant, or observations regarding the attack.

The system can send notifications of an attack or potential attack to the appropriate subscribers. Certain subscribers who are under attack are not going to want to look at a lot of information. It would be cluttering for them while they are busy trying to deal with an attack. Some might want to see a few, four, five vital pieces of data in total. Others subscribers might desire to see more information to allow them to study the situation and see what these trends are like.

Alternatively, subscribers could be sent a clickable link, which when clicked on would give the subscribers a configurable view of the attack data. Users under attack can receive a message, and they could log in to a dashboard and look at application information. Depending on who is receiving a message, the information presented can be configured for them. Certain users, maybe a director might want to not look at a dashboard, whereas a technical operator might want to go through a dashboard and see all of the data. The information is delivered in real time and can be used by a dashboard system as well as stored as attack information even after the fact it can be desirable to have historic information in a legible form.

Subscribers can have access to the information based on APIs. For example, the available information may be presented like a menu for subscribers to take what they want to know. The system may execute many calls to APIs to get many different vital pieces of data.

The system can provide proactive communication to subscribers about attack triggers, real time information regarding attacks, pushing information to them rather than pulling it periodically, pushing real time information to them based on thresholds that are measureable and being able to notify them to makes changes. For example letting them know that larger encryption is needed or larger order of attack mitigation is required by them so basically saving them before it is too late.

Once the system has identified that multiple thresholds have been exceeded for multiple different categories, the attack would be associated with multiple categories when an attack does happen. When an attack does happen, the system would identify what the exact target is. If an attack was at a particular website or a particular IP address for example, the mortgage section (or maybe their banking as opposed to their brokerage area) could depend exactly on what type of attack it is. Specific IP addresses can be assigned to certain categories.

VI. UPGRADING SERVICE

When an attack is detected, certain automated actions can be taken to mitigate the attack. If a client is subscribing to be able to handle 20 to 50 gigabit attacks, which might be insufficient to handle a certain attack of a larger size, embodiments allow for automatically increasing the level of protection afforded without getting an official okay from the client. This can be configurable by the client to allow or disallow automatic upgrades of service.

Later on after an attack has subsided, the client can be notified to let them know that the system went ahead and upped the level of protection. The client could be asked whether they would like to continue at the higher level of protection, or drop down to the lower, previous level of protection. Additionally, the system can query other members of a vertical that might not necessarily have been attacked, and query them to see if they would like to upgrade their protection.

For example, if one bank is a subscriber and under an attack, where the attack is larger than what their customer profile is or what their paying for, the system can tell them that it was necessary to increase their capacity. A second customer bank is also a subscriber, and is in the same vertical, but was not attacked. The second bank in this vertical is asked whether they would like to increase their level of protection preemptively to a level sufficient to mitigate the attack for the first bank.

One subscriber might have a variety of different agreements or procedures. Under an agreement the subscriber might automatically increase their level of protection up to a set limit and then for any additional protection, the system could send out a notification. The system could default to continue increasing the amount of protection in set increments as needed unless the subscriber says otherwise.

In another case where a subscriber has set a limit on the amount of protection, the system may allow two hours or some other time limit for the subscriber to decide if they want to increase to a higher level of protection. If the traffic level exceeds the level of protection, the system will null route the subscriber. After that if the system, has not heard anything it may drop down the protection and anything over the new lower level, then the system will start a null route at the lower level of protection. This allows for greater flexibility for larger subscribers.

For billing, the system could have a calculator that take in the threshold and proposed increases in coverage and duration and could produce a cost. Upon presenting additional costs, the system could have a mechanism for clicking and allowing the upgrade.

VII. EXAMPLES REPORTS

Figure 3:
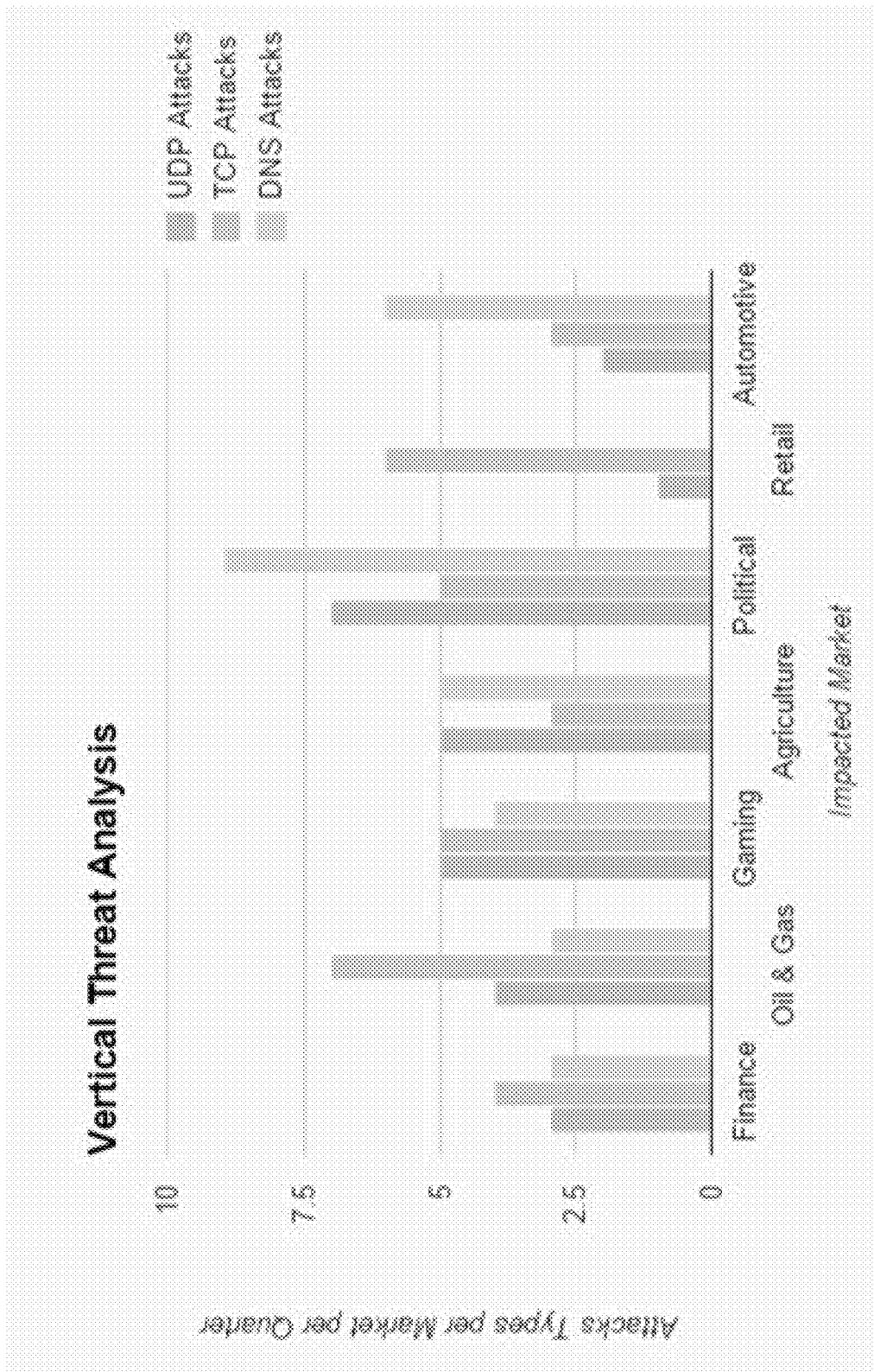
FIG. 3 shows a sample report plotting various attacks types in several impacted markets over a quarter.

FIG. 3 shows a sample report for vertical threat analysis, plotting various attack types per market over the course of a quarter year. In FIG. 3, the numbers of attacks in the finance, oil & gas, gaming, agriculture, political, retail, and automotive markets over a quarter are broken out by UDP, TCP and DNS attacks. For example, the Retail market experienced UDP and TCP attacks, but no DNS attacks over the quarter. This report allows for the visualization of attack type by market over a period of time.

VIII. COMPUTER SYSTEM

Figure 4:
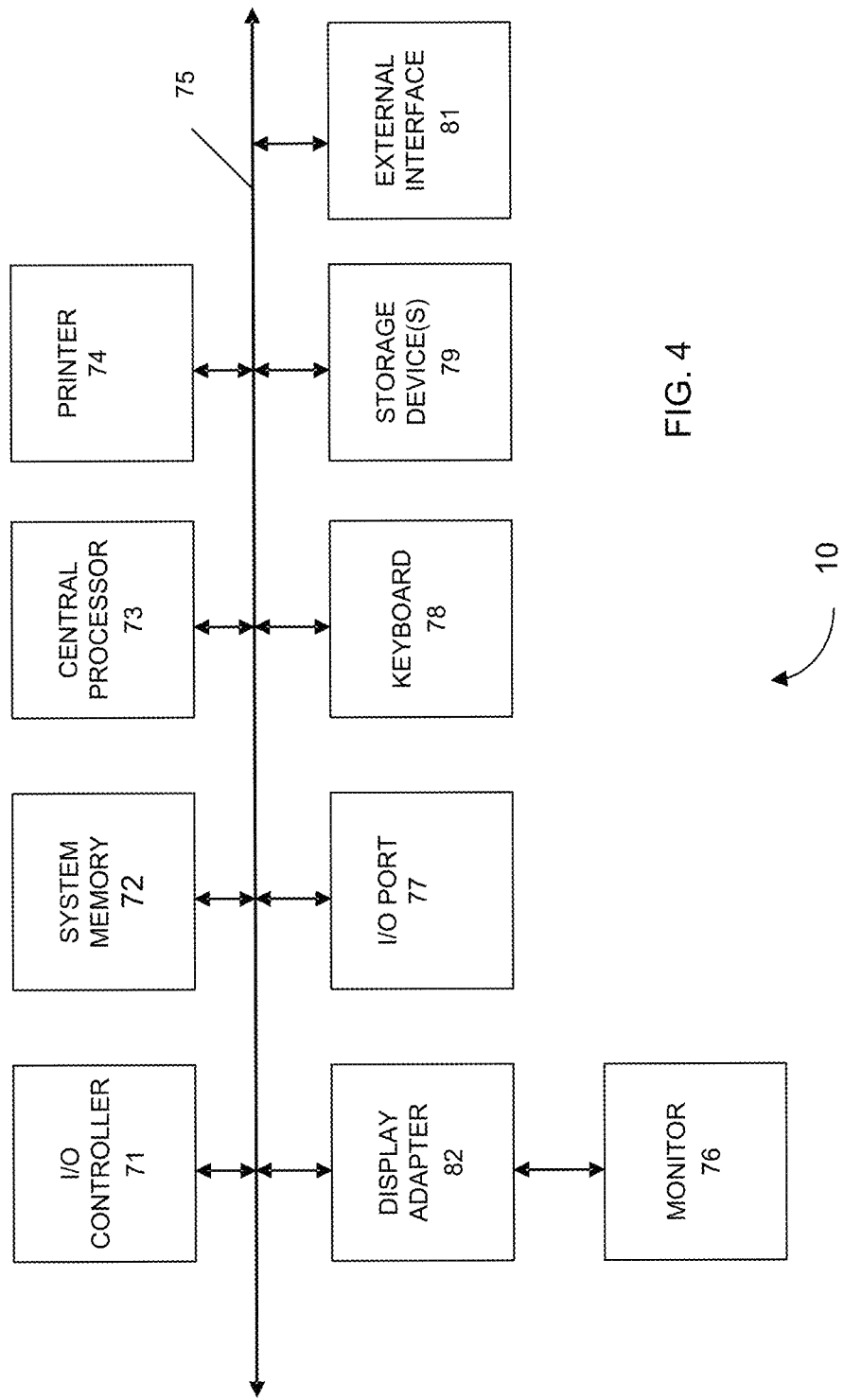
FIG. 4 shows a block diagram of an example computer system usable with system and methods according to embodiments of the present invention.

Any of the computer systems mentioned herein may utilize any suitable number of subsystems. Examples of such subsystems are shown in FIG. 4 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 4 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method of providing notifications of a distributed denial of service (DDoS) attack to a customer and mitigating the DDoS attack, the method comprising performing, by a computer system:
   receiving an indication from a first customer that the first customer is associated with a first market vertical;
   receiving an indication from a second customer that the second customer is associated with the first market vertical;
   receiving an indication that one or more first network resources associated with the first customer are experiencing a DDoS attack;
   monitoring a rate of the attack to obtain one or more measured rates;
   calculating a first quantity from the one or more measured rates of the attack on the one or more first network resources;
   comparing the first quantity to a first threshold;
   when the first quantity exceeds the first threshold, retrieving statistical data about the attack;
   providing a first notification to the first customer, the first notification providing access to the statistical data;
   identifying, based on the identification from the first customer and the identification from the second customer, a second network resource associated with the second customer; and
   increasing, based on the comparing indicating that the first quantity exceeds the first threshold, a level of DDoS protection for the second network resource of the second customer for a selected amount of time.

2. The method of claim 1, wherein the first quantity corresponds to a peak rate.

3. The method of claim 1, wherein the first quantity corresponds to a sustained rate over a specified time.

4. The method of claim 1, further comprising:
sending a second notification to the second customer in response to the first quantity exceeding a second threshold.

5. The method of claim 4, wherein the first threshold equals the second threshold.

6. The method of claim 1, further comprising:
computing the statistical data using the monitored rate of the attack.

7. The method of claim 6, wherein the indication is received from one or more mitigation devices, and wherein computing the statistical data includes:
after receiving the indication that the one or more first network resources associated with the first customer are experiencing a DDoS attack:
requesting attack data from the one or more mitigation devices, the attack data including the monitored rate of the attack.

8. The method of claim 1, wherein the first notification includes the statistical data.

9. The method of claim 1, wherein the first notification provides a link to the statistical data.

10. The method of claim 1, wherein the level of DDoS protection for the second network resource of the second customer is sufficient to mitigate the DDoS attack experienced at the one or more first network resources of the first customer.

11. A system for providing notifications of a distributed denial of service (DDoS) attack to a customer, the system comprising:
at least one processor communicably coupled to a memory, wherein the memory is operable to store instructions for execution by the at least one processor, the at least one processor operable to execute the instructions to perform the steps of:
receiving an indication from a first customer that the first customer is associated with a first market vertical;
receiving an indication from a second customer that the second customer is associated with the first market vertical;
receiving an indication that one or more first network resources associated with the first customer are experiencing a DDoS attack;
monitoring a rate of the attack to obtain one or more measured rates;
calculating a first quantity from the one or more measured rates of the attack on the one or more first network resources;
comparing the first quantity to a first threshold;
when the first quantity exceeds the first threshold, retrieving statistical data about the attack;
providing a first notification to the first customer, the first notification providing access to the statistical data;
identifying, based on the identification from the first customer and the identification from the second customer, a second network resource associated with the second customer; and
increasing, based on the comparing indicating that the first quantity exceeds the first threshold, a level of DDoS protection for the second network resource of the second customer for a selected amount of time.

* * * * *